United States Patent [19]

Vander Molen et al.

[11] 4,357,729
[45] Nov. 9, 1982

[54] VACUUM CLEANER CONTROL

[75] Inventors: Donald R. Vander Molen; Roger L. Nyland, both of Lincoln Township, Berrien County, Mich.

[73] Assignee: Whirlpool Corporation, Benton Harbor, Mich.

[21] Appl. No.: 228,279

[22] Filed: Jan. 26, 1981

[51] Int. Cl.³ .............................................. A47L 9/28
[52] U.S. Cl. ...................................... 15/319; 15/377; 318/99; 318/434
[58] Field of Search ...................... 15/377, 327 R, 319; 318/98, 99, 434

[56] References Cited

U.S. PATENT DOCUMENTS

| | | | |
|---|---|---|---|
| 3,205,420 | 9/1965 | Cobb | 318/99 |
| 3,551,775 | 12/1970 | Safiuddin | 318/98 |
| 3,579,706 | 5/1971 | Hetland | 15/377 X |
| 3,588,943 | 6/1971 | Hetland | 15/377 X |
| 4,021,879 | 5/1977 | Brigham | 15/319 |

*Primary Examiner*—Chris K. Moore
*Attorney, Agent, or Firm*—Wegner, McCord, Wood & Dalton

[57] ABSTRACT

A vacuum cleaner structure having a control for reducing the total current delivery to the vacuum cleaner as when both a suction motor thereof and a brush motor thereof are being operated concurrently. The control includes an "On-Off" switch mounted on a portion of the suction hose for the vacuum cleaner. The invention comprehends the provision of such a current-reducing control where the full load currents of the suction and brush motors cumulatively total an amount greater than a preselected safe current deliverable to the vacuum cleaner. The control is arranged to be used with a vacuum cleaner having a suction hose connected between a suction unit and a cleaning unit thereof, such as a floor cleaning unit. In one form, the control utilizes a two-conductor wire suction hose, and in another form, the control utilizes a three-conductor wire suction hose. The "On-Off" switch is mounted on the handle on the end of the suction hose which may be attached to a cleaning unit and circuitry is provided in a control portion carried by the suction unit responsive to the disposition of the "On-Off" switch to effect the desired current and speed control of the system. The handle-mounted "On-Off" switch also controls the suction unit during cleaning operations which do not employ a floor cleaning unit including a motor-driven brush.

36 Claims, 8 Drawing Figures

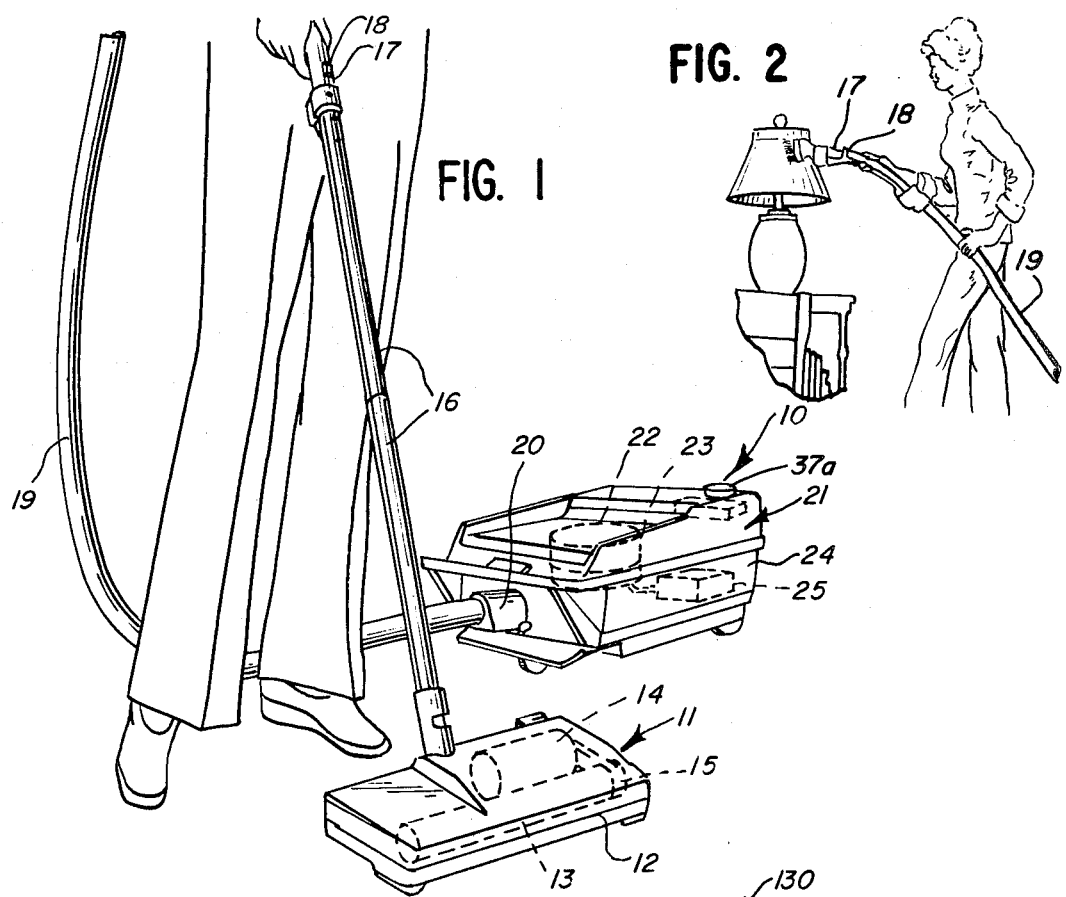
FIG. 1
FIG. 2
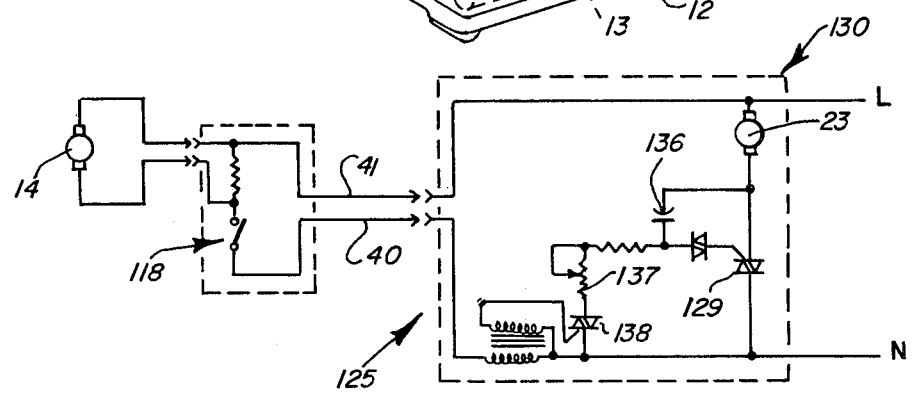
FIG. 5
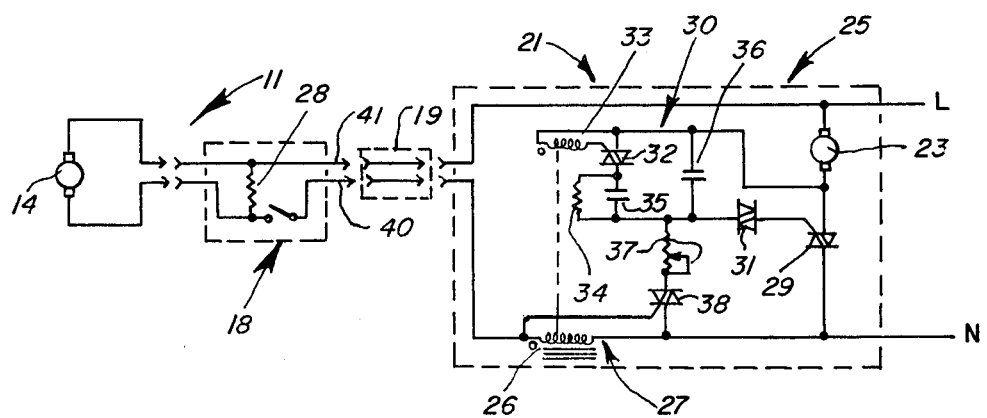
FIG. 4

VACUUM CLEANER CONTROL

BACKGROUND OF THE INVENTION

1. Field of the Invention

This invention relates to vacuum cleaner structures and in particular to control means for use therein.

2. Description of the Prior Art

In one conventional vacuum cleaner system, a floor cleaning unit is provided with a handle for movement thereof over the floor to be cleaned. The floor cleaning unit is connected through wand handle sections and a suction hose to a canister suction unit having means for drawing a vacuum through the suction hose to the floor cleaning unit.

As is conventional, the suction hose may have incorporated therewith electrical conductors for energizing a brush motor provided in the floor cleaning unit without the need for separate wires extending between the canister and floor cleaning unit. On-off control of the vacuum cleaner is conveniently effected by a suitable "On-Off" switch provided on the handle of the hose attached to the canister suction unit.

One example of such a vacuum cleaner structure is illustrated in U.S. Pat. No. 3,588,943 of Thomas E. Hetland, which patent is owned by the assignee hereof. As shown therein, a control is provided in association with the three electrical conductors of the suction hose for selectively operating the suction motor independently of the brush motor and causing the suction motor to run at a preselected reduced speed when operated concurrently with the brush motor. The control requires that whenever the brush motor is energized, the suction motor be energized to operate at a low speed regardless of the total amount of current being utilized by the two motors.

Robert L. Daugherty shows, in U.S. Pat. No. 3,077,542, an electrical control system having means responsive to an overload condition in one circuit for reducing the total effective load of a second circuit as long as the overload condition continues to exist in the first circuit.

In U.S. Pat. No. 3,579,706 of Thomas E. Hetland, which patent is also owned by the assignee hereof, a vacuum cleaner motor control is shown to include a circuit for varying the current to the suction motor, thereby varying the amount of suction applied to the floor cleaning unit. A second switch circuit is provided for energizing the brush motor, when desired. The switch utilized is a double-pole, triple throw switch, involving two switching circuits, one of which controls the speed of the suction motor and the other of which controls the operation of the brush motor.

William T. Wickham et al show, in U.S. Pat. No. 3,636,285, a vacuum cleaner hose assembly having a control device carried by the suction hose with the matrix material of the hose connector providing the sole support of the control device.

Robert N. Brigham shows, in U.S. Pat. No. 4,021,879, a vacuum cleaner structure having means for automatically maintaining the volumetric air flow substantially constant within limits of the capabilities of the system under varying conditions of resistance to such flow. A switch is provided on the handle to start and stop the suction motor, as well as a brush motor in the nozzle of the floor cleaning unit.

SUMMARY OF THE INVENTION

The present invention comprehends an improved vacuum cleaner structure having control means for causing the current provided to the vacuum cleaner from a power source to be reduced so that it is no greater than a preselected safe current notwithstanding the concurrent energization of the suction motor and brush motor of the vacuum cleaner.

More specifically, the invention is advantageously adapted for use in a vacuum cleaner powered from a conventional 110–120 volt, 15 ampere branch circuit wherein the normal full load currents of the suction motor and brush motor total an amount greater than a current predetermined to be safe for delivery through the branch circuit to the vacuum cleaner. Illustratively, it has been predetermined by vacuum cleaner industry standards established by Underwriters Laboratories, Inc. that the total amount of current safely deliverable to such a vacuum cleaner appliance through a 110–120 volt, 15 ampere branch circuit should be limited to a current of approximately 13.2 amperes. The present invention provides means for effectively reducing the current delivery to such a safe current while yet permitting both motors to be operated concurrently without substantially adversely affecting the operating efficiency of the vacuum cleaner.

The invention is advantageously adapted for use with such a vacuum cleaner system wherein the suction hose provided between the floor cleaning unit and the canister suction unit is provided with a pair of electrical conductors, as is conventional, to provide the necessary electrical energy to the brush motor. Where only two such conductors are provided as in the preferred embodiment shown in FIG. 3, the control utilizes an "On-Off" switch carried by the handle of the hose which may be attached to the floor cleaning unit and circuitry carried by the suction unit.

The control circuit is responsive to the operation of the switch mounted on the handle for "On-Off" operation of the suction unit and to effect the desired automatic current reduction in the event a floor cleaning unit including a motor-driven brush is attached to the suction unit. In the event a different attachment, such as a dusting brush tool is used, the tool is attached to the hose handle and the switch mounted on the handle may be actuated for "On-Off" control and operation of the suction unit with no reduction of the current to the suction motor.

In another form, the hose is provided with three electrical conductors, and a number of different embodiments of the invention utilize such a three-conductor system with different forms of "On-Off" switches carried by the handle and circuitry carried by the suction unit.

The control is caused to be responsive to the energization of the brush motor to effect the desired reduction of current delivery to the unit by reducing the amount of current drawn by the suction motor. This reducing control of the current is effected automatically when the "On-Off" switch is arranged to concurrently energize the brush and suction motors.

In the illustrated embodiment, the suction motor current is controlled by a gated electronic switch. The amount of current permitted to pass through the suction motor is controlled by control of the firing angle of the electronic switch which, in turn, is determined by the control circuitry.

In one preferred form, the control utilizes a transformer which is responsive to current delivered to the brush motor to effect the automatic control of the firing angle of the electronic switch controlling the current flow through the suction motor.

The control may further include means for varying the speed of the suction motor. The control is arranged to permit a maximum range of speed control when the suction motor is energized independently of the brush motor. The automatic reduction in current flow to the suction motor effected by the control when concurrent energization of the suction motor and brush motor is effected, may be utilized in conjunction with the suction motor speed control which, under such current-reducing conditions, provides a reduced adjustable speed range. Control of the speed of the suction motor is effected by control of the firing angle of the gated electronic switch.

The control of the present invention is extremely simple and economical of construction while yet providing an improved, accurate control of the current delivery to the vacuum cleaner under different conditions of operation thereof.

BRIEF DESCRIPTION OF THE DRAWING

Other features and advantages of the invention will be apparent from the following description taken in connection with the accompanying drawing wherein:

FIG. 1 is a fragmentary perspective view of a vacuum cleaner structure embodying the control of the present invention, with the structure shown to include an attached floor cleaning unit;

FIG. 2 is a fragmentary perspective view of a portion of the vacuum cleaner structure of FIG. 1, with the structure shown to include an attached tool for above-the-floor cleaning;

FIG. 4 is a schematic wiring diagram illustrating one form of control embodying the invention;

FIG. 5 is a schematic wiring diagram illustrating another form of control embodying the invention;

DESCRIPTION OF THE PREFERRED EMBODIMENTS

Figure 3:
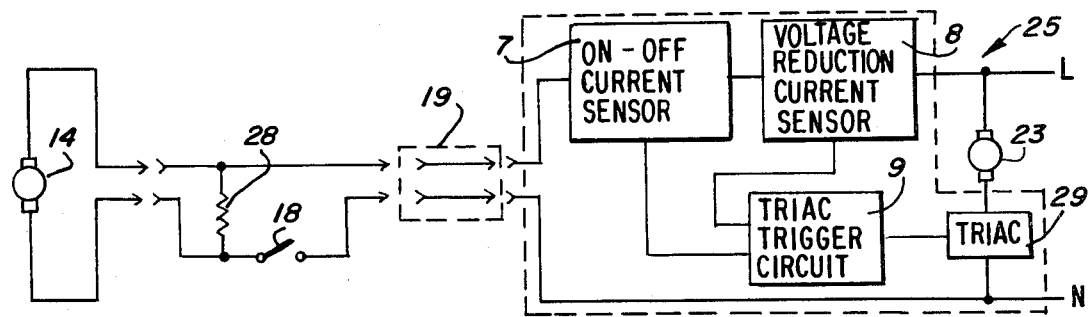
FIG. 3 is a block diagram of the control circuit of the invention.

In the exemplary embodiment of the invention as disclosed in FIGS. 1, 2, 3 and 4 of the drawing, a vacuum cleaner structure generally designated 10 is shown to include a floor cleaning unit generally designated 11 having a nozzle 12 provided with a brush 13 driven by a brush motor 14 through a belt drive 15. The floor cleaning unit is provided with a handle including a pair of connected wand handle sections 16 having an upper end connected to a suction hose 19, via an end portion thereof having a handle portion 17 provided with an "On-Off" switch 18 for selective energization of the vacuum cleaner by the user. As is conventional the floor cleaning unit 11 includes a pair of electrical conductors connected to motor 14, and which extend along the wand handle sections 16 to handle 17 which is electrically connected to electrical conductors in hose 19.

Suction is provided to the nozzle 12 through the suction hose 19 connected between the upper end of wand handle sections 16 and a suction inlet 20 of a canister suction unit generally designated 21. The suction hose 19 is a conventional two-wire vacuum cleaner hose and includes two electrical conductors extending along its length, and molded cuffs including electrical terminals on end portions. The suction unit includes a suction fan 22 driven by a suitable electric motor 23 mounted within the housing 24 of the canister, a power cord, and a conventional electrical plug, not shown, adapted for connection to a suitable A.C. power source, through a conventional wall mounted receptacle. Thus, when the suction motor 23 is energized to operate suction fan 22, a vacuum is applied to nozzle 12 through wand handle sections 16 and suction hose 19 to effect the desired vacuum cleaning operation. As is conventional in such systems, a suitable dirt-collecting bag (not shown) may be provided within the housing 24 for collecting the dirt sucked from the surface being cleaned such as the floor being cleaned by the nozzle 12.

As indicated above, in a normal use of the vacuum cleaner 10 for a floor cleaning operation, the floor cleaning unit is connected to the canister so as to require concurrent energization of the brush motor 14 and suction fan motor 23. It has been found that the full load current ratings of such motors cumulatively total a value greater than a preselected safe current for a conventional 110–120 Volt A.C. 15 ampere branch circuit to which such appliances are conventionally connected. Illustratively, it has been predetermined that the recommended upper limit for a safe current to be supplied from a single branch circuit to such a vacuum cleaner appliance is approximately 13.2 amperes in accord with the applicable standard of Underwriters' Laboratories, Inc. It is desirable to utilize relatively powerful suction fan motors 23 and, thus, it is advantageous to utilize such a motor drawing a rated full load current which, when added to the rated full load current of the brush motor 14, exceeds the recommended 13.2 amp. safe current limit for the branch circuit. The present invention comprehends means for effectively preventing the vacuum cleaner current from exceeding the preselected safe current notwithstanding the selective concurrent energization of the suction and brush motors.

More specifically, referring to FIGS. 3 and 4, the invention comprehends the use in such a vacuum cleaner of an improved control generally designated 25 which automatically limits the current flow. As shown, the electrical current is provided from a conventional 110–120 volt A.C. power source, connected to a 15 ampere rated branch circuit including a domestic wall-plug receptacle. The vacuum cleaner 10 includes a conventional plug (not shown) received by the receptacle and the plug is connected to power supply leads L and N. Lead L is connected directly to one side of the brush motor 14 when the hose is connected between the suction and floor cleaning units. The other side of brush motor 14 is connected through switch 18 and the primary 26 of a transformer 27, to the power supply lead N. Switch 18, in the embodiment of FIGS. 3 and 4, comprises a single pole, single throw switch which, when closed by the operator, assuming floor cleaning unit 11 is in use, provides a circuit through brush motor 14 and transformer primary 26 to energize the brush motor 14. A resistor 28 is enclosed in handle 17 and connected from switch 18 to conductor 41 to permit current flow through transformer primary 26, the gate of triac 38 and switch 18 when the brush motor is not being used, such as when the vacuum cleaner is being used for above-the-floor cleaning, for example, for cleaning draperies, upholstery and the like as shown in FIG. 2. In such applications the hose mounted "On-Off" switch 18 of the control of the present invention is quite convenient.

FIG. 2, which is a block diagram of the control, generally designated 25, of the present invention, includes an "On-Off" current sensor 7, a voltage reduction current sensor 8, a triac trigger circuit 9, and a triac 29.

The "On-Off" current sensor 7 includes the primary 26 of the transformer 27 and a triac 38 which is connected to power supply lead N and is gated on by current through its gate and primary 26 as shown in FIG. 4.

The voltage reduction current sensor 8 includes the secondary winding 33 of the transformer 27, and the triac 32 as shown in FIG. 3.

The triac trigger circuit 9 includes a capacitor 36, a variable resistor 37, and a diac 31.

Current flow through suction fan motor 23 is controlled by a gated electronic switch illustratively comprising the triac 29. The gating of triac 29 is controlled by a circuit generally designated 30 responsive to current flow through transformer primary 26.

More specifically, circuit 30 includes the diac 31 which is connected to the gate of triac 29. Diac 31, in turn is controlled by triac 38 through variable resistor 37 and capacitor 36. Triac 38 is gated on by current through its gate and transformer primary winding 26. Gating on of triac 38 completes a conventional time delay circuit including capacitor 36 and variable resistor 37 for controlling the firing angle of triac 29 through diac 31. The speed of suction motor 23 is adjustably controlled by variable resistor 37 connected through triac 38 to power supply lead N.

The current through motor 23 is reduced upon connection of brush motor 14 by the turning on of triac 32 which is part of the voltage reduction current sensor 8. Triac 32 turns on as a result of the current flow from brush motor 14 through transformer primary 26, inducing sufficient current in secondary 33 to turn on triac 32. This places capacitor 35 and resistor 34 in parallel with capacitor 36 which provides added time delay and retards the firing angle of triac 29. This reduces the voltage to suction motor 23 and hence reduces the vacuum cleaner current below the aforementioned safe level.

In the operation of the vacuum cleaner without brush motor 14, such as for above-the-floor cleaning in which a dusting brush (not shown) or equivalent tool would be connected to the end of the wand handle sections 16, on-off control of the suction motor 23 is effected by closure of "On-Off" switch 18 which permits current to flow through the gate of triac 38, transformer primary 26 which forms part of "On-Off" current sensor, switch 18 and resistor 28 which energizes the gating circuit for triac 29. Thus, when the brush motor 14 is not included in the circuit, the control circuit is completed through resistor 28. With the brush motor 14 attached, on-off operation with switch 18 is the same for suction motor 23 and is a straight forward line connection for brush motor 14. The addition of brush motor 14 current in the transformer primary 26 induces sufficient current in transformer secondary 33 to turn on triac 32 and cause a retardation in the firing angle for triac 29 which causes the current reduction. The triac 32 senses current flow through the transformer secondary winding 33 as the switch 18 is closed to complete the current path.

As will be obvious to those skilled in the art, the parameters of the circuit components and firing angles are preselected so as to assure that the total current flow from the power supply leads L and N does not exceed the preselected safe total current flow limit for the circuit, such as 13.2 amperes. The current-reducing function is provided in combination with the speed control permitted by the adjustable resistor 37 which is adjusted by a rotatable knob 37a, although, as will be obvious to those skilled in the art, the range of speed during the current-reducing function is reduced from that permitted where no current reducing is effected as the current-reducing circuitry functions similarly to the speed control functioning in retarding the firing angle of the triac 29.

Another control circuit generally designated 130 embodying the invention is illustrated in FIG. 5. As shown therein, a control circuit generally similar to control circuit 30 is provided for controlling the current flow to the brush motor 14 and suction motor 23. In the control circuit 130, however, the current reducing triac 32 is omitted and the control provides firing angle control of the triac 129 solely for varying the speed of suction motor 23 through the adjustable resistor 137. In all other respects, however, the control circuit 130 is similar to control circuit 30 and functions in a similar manner in controlling the speed of suction motor 23 when the on-off switch 118 is closed to effect energization of the suction motor with or without brush motor 14 attached.

Figure 6:
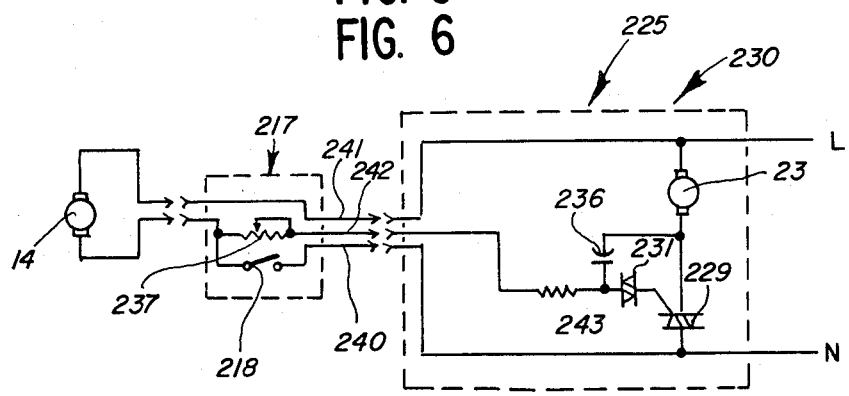
FIG. 6 is a schematic wiring diagram illustrating still another form of control embodying the invention.

Referring now to FIG. 6, a further modified control generally designated 230 for controlling the concurrent energization of the suction motor 23 and brush motor 14 from an on-off switch 218 carried by the handle 217 of the hose is illustrated. In the embodiment of FIG. 6, the hose 19 is provided with three electrical conductors extending lengthwise thereof, conductors 240, 241 and 242. The speed control variable resistor 237 is mounted in association with switch 218 on the handle portion 217 and is connected from such a motor 14 through third conductor 242 to a resistor 243 connected through diac 231 to the gate of triac 229. The capacitor 236 is connected between suction motor 23 and diac 231 and cooperates with resistor 243 in controlling the firing angle of triac 229 as a function of the setting of variable resistor 237. Thus, control 230 is similar to control 130 in omitting the current-limiting circuitry of control 30, while providing the improved speed control of suction motor 23 through the gated electronic switch 229.

Control 230 further provides the disposition of the variable resistor 237 in the handle for adjustment of the suction motor speed at the floor cleaning unit in lieu of the provision of the adjustable resistor in the suction unit of the controls 30 and 130.

Figure 7:
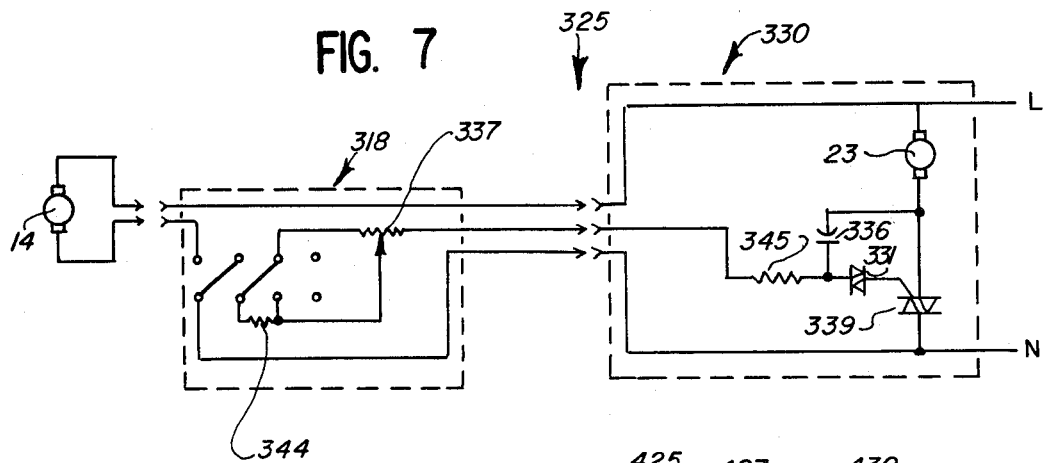
FIG. 7 is a schematic wiring diagram illustrating yet another form of control embodying the invention.

Referring now to FIG. 7, still another embodiment of the control of the present invention is shown to comprise a control generally designated 330 which differs from control 230 in the utilization of a modified form of control switch 318 carried by the handle. Control switch 318 comprises a three-position switch having a first "off" position wherein the suction motor 23 and brush motor 14 are disconnected from the power supply. In a second position, the switch connects the suction motor 23 only to the power supply and permits a full range speed control of the brush motor by the gated control of triac 339.

In the third position, switch 318 closes the circuit to brush motor 14 and concurrently energizes suction motor 23. At the same time, the switch inserts into the circuit of the adjustable resistor 337 a fixed resistor 344 so as to increase the time constant of the firing circuit and thereby provide a current-reducing gated control of triac 339 while permitting speed control of the suction motor over a reduced speed range by the adjustable resistor 337. Control 330 is similar to control 230 in utilizing a three-conductor hose connection between the floor cleaning unit and suction unit of the vacuum cleaner carried by the hose 19. Control 330 provides the additional features provided in control 25, namely, the automatic current-reducing control of the suction motor so as to reduce the total current demand of the vacuum cleaner when the suction and brush motors are concurrently energized while yet permitting adjustment of the speed of the suction motor over a reduced speed range.

Figure 8:
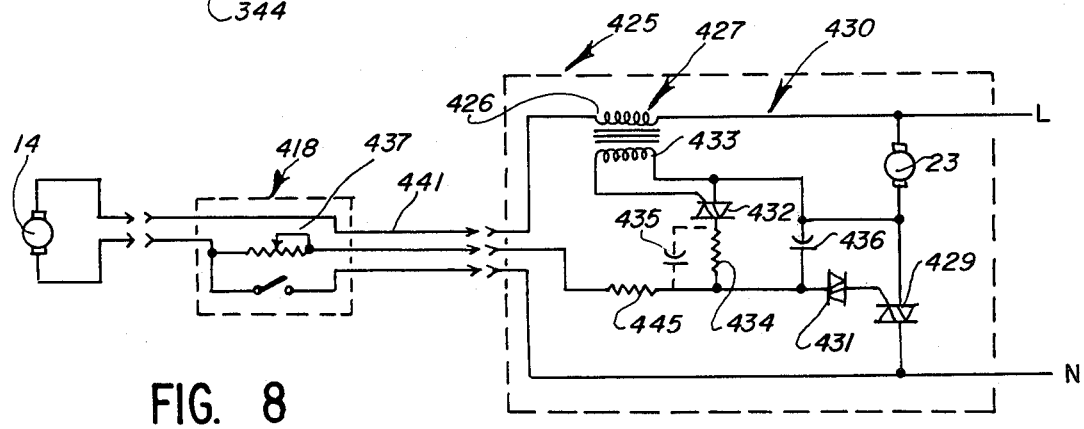
FIG. 8 is a schematic wiring diagram illustrating a yet further control embodying the invention.

Referring now to the embodiment of FIG. 8, a further control generally designated 425 embodying the invention utilizes a circuit 430 which is somewhat similar to the circuit 30 of control 25 in the use of a transformer generally designated 427 in providing the concurrent current-reducing and speed control of the system. Control 425 utilizes a handle switch generally designated 418 similar to the switch 218 of control 230. However, transformer 427 includes a primary winding 426 connected to power supply lead L and to the hose conductor 441 leading to the brush motor 14. The secondary winding 433 of transformer 427 is connected through a triac 432 to the diac 431 of the circuit 430. The circuit includes a resistor 445 connected to the diac 431 and resistor 434 and capacitor 435 which are placed in parallel with capacitor 436 when the triac 432 turn on to retard the firing time of triac 429 and thereby provide the preselected current reduction through suction motor 23 while yet permitting control of the speed over a reduced range by the variable resistor 437 in the handle-operated control 418.

Thus, control 425 functions similarly to control 125 in that the brush motor current flowing through the primary of the transformer 427 turns on the triac 432 to automatically effect the desired current reduction in suction motor 23 when the brush and suction motors are concurrently energized.

Thus, the invention comprehends an improved speed control for use in a vacuum cleaner. In a number of the embodiments, the control circuitry includes means for automatically reducing the suction motor current to limit the total current delivered through the branch circuit to the vacuum cleaner structure to a preselected safe current, such as 13.2 amperes, where the vacuum cleaner is adapted for use on a conventional 110–120 volt alternating current power supply. The invention comprehends such a control circuitry which automatically effects this current reduction of the suction motor current by retarding the firing angle of a triac controlling the current flow through the suction motor at all times. While the suction motor is thusly operated at a reduced power, the current reduction is relatively small so that cleaning performance is essentially maintained while yet assuring proper safe current delivery to the vacuum cleaner without exceeding the maximum current rating for the circuit.

The invention comprehends the provision of such control circuitry utilizing a current delivery means to the brush motor comprising, in certain embodiments, two only conductors carried by the suction hose and, in other embodiments, three conductors carried thereby. In each case, on-off control of the suction motor is effected by the switch in the handle and an automatic current reduction occurs when the brush motor is attached by a reduction in the voltage applied to the suction motor. Where the suction unit is utilized independently of the floor cleaning unit, as indicated above, the suction unit motor may be operated at full load current, which is customarily less than the preselected safe current discussed above.

In certain of the illustrated embodiments, the control of the firing angle of the current controlling triac is effected through transformer means. As will be obvious to those skilled in the art, other suitable control circuit elements may be utilized within the scope of the invention in effecting such control.

Thus, the control circuit of the present invention is extremely simple and economical of construction while yet providing on-off control in the handle which is remote from the suction unit and an improved safe operation of the vacuum cleaner at all times notwithstanding the cumulative total of full load currents of the suction and brush motors thereof being greater than the preselected safe current for the circuit.

The foregoing disclosure of specific embodiments is illustrative of the broad inventive concepts comprehended by the invention.

We claim:

1. In a vacuum cleaner having a suction motor constructed to draw a first full load current, and a brush motor constructed to draw a second full load current, the sum of said currents being greater than a preselected current to be provided from a power source to the vacuum cleaner for operation thereof, the improvement comprising
control means carried by a portion of the vacuum cleaner for causing the current provided from the power source to be reduced such that it will not exceed said preselected current during concurrent operation of the suction and brush motors.

2. The vacuum cleaner structure of claim 1 wherein said control means comprises means for providing full load current to said brush motor and an operating current less than said first full load current to said suction motor during said concurrent operation thereof.

3. The vacuum cleaner structure of claim 1 wherein said control means further comprises means for adjusting the speed of the suction motor.

4. The vacuum cleaner structure of claim 1 including a handle portion, said control having an "On-Off" switch carried by said handle and causing concurrent energized and de-energized conditions of said suction and brush motors.

5. The vacuum cleaner structure of claim 1 including a canister having said suction motor, a floor cleaning portion having said brush motor, and a suction hose connecting said canister and floor cleaning portion, said hose carrying electrical conductors and including a handle having an "On-Off" switch for causing an energized condition of said suction and brush motors through said conductors.

6. The vacuum cleaner structure of claim 1 including a canister having said suction motor, a floor cleaning portion having said brush motor, and a suction hose connecting said canister and floor cleaning portion, said hose carrying only two electrical conductors, and having an "On-Off" switch for causing an energized condition of said suction and brush motors through said two conductors.

7. In a vacuum cleaner having suction means including a suction motor constructed to draw a first full load current, and floor cleaning means including a brush motor constructed to draw a second full load current, the sum of said currents being greater than a preselected current to be provided from a power source to the vacuum cleaner for operation thereof, the vacuum cleaner further having a suction hose having a first end associated with said suction means and an opposite end associated with said floor cleaning means, said hose being provided with only two electrical conductors connected to the power source, the improvement comprising
control means having a portion carried by said suction hose for causing the current provided from the power source to be no greater than said preselected current during concurrent operation of the suction and brush motors.

8. The vacuum cleaner structure of claim 7 wherein said portion of the control comprises an "On-Off" switch carried adjacent a connection of the hose second end to said floor cleaning means.

9. The vacuum cleaner structure of claim 7 wherein said control means further comprises means for adjusting the speed of the suction motor, said speed adjusting means being carried by said suction means.

10. In a vacuum cleaner having a suction unit including a suction motor arranged to draw a first full load current, a floor cleaning unit including a brush rotatably driven by a brush motor arranged to draw a second full load current, and a suction hose connected between the suction unit and the floor cleaning unit and having a handle and only two electrical conductors extending lengthwise thereof, the improvement comprising:
an "On-Off" switch carried by said handle and connected to at least one of said hose conductors;
brush motor conductors carried by said floor cleaning unit for providing controlled energization of said brush motor by said "On-Off" switch; and
control means carried by said suction unit responsive to said "On-Off" switch for causing energization of said suction motor concurrently with energization of said brush motor while preventing the total electrical current drawn by said suction and brush motors from being greater than a preselected current less than the total of said full load motor currents.

11. The vacuum cleaner structure of claim 10 wherein said control means includes means for adjusting the speed of said suction motor while maintaining said total current no greater than said preselected current.

12. The vacuum cleaner structure of claim 10 wherein said control means includes a gated current-limiting device in series with said suction motor and circuitry activated by said "On-Off" switch being arranged to energize said motors for controlling the "On" condition of said gated device to limit the current drawn by said suction motor and thereby prevent the total electrical current drawn by said suction and brush motors to be no greater than a preselected current less than the total of said full load motor currents.

13. The vacuum cleaner structure of claim 10 wherein said control means includes a gated current-limiting device in series with said suction motor and circuitry activated by said "On-Off" switch being arranged to energize said motors for controlling the "On" condition of said gated device to reduce the current drawn by said suction motor and thereby prevent the total electrical current drawn by said suction and brush motors from being greater than a preselected current less than the total of said full load motor currents, and said circuitry includes means responsive to the current flowing through said brush motor to initiate operation of the gated device to energize said suction motor.

14. The vacuum cleaner structure of claim 10 wherein said control means includes a gated current-limiting device in series with said suction motor and circuitry activated by said "On-Off" switch being arranged to energize said motors for controlling the "On" condition of said gated device to limit the current drawn by said suction motor and thereby prevent the total electrical current drawn by said suction and brush motors from being greater than a preselected current less than the total of said full load motor currents, and said circuitry includes transformer means in series with said brush motor to initiate operation of the gated device to energize said suction motor.

15. In a vacuum cleaner having a suction unit including a suction motor, a floor cleaning unit including a brush rotatably driven by a brush motor, and a suction hose connected between the suction unit and the floor cleaning unit and having a handle and only two electrical conductors extending in parallel lengthwise thereof, the improvement comprising:
an "On-Off" switch carried by said handle and connected to at least one of said hose conductors;
brush motor conductors carried by said floor cleaning unit for providing controlled energization of said brush motor by said "On-Off" switch; and
control means carried by said suction unit responsive to said "On-Off" switch for causing energization of said suction motor concurrently with energization of said brush motor, said control means including a gated electronic switch in series with said suction motor and circuitry responsive to current flow through said brush motor to effect said energization of the suction motor.

16. The vacuum cleaner structure of claim 15 wherein said circuitry includes a transformer means in series with said brush motor to initiate operation of the gated switch to energize said suction motor.

17. The vacuum cleaner structure of claim 15 wherein said circuitry includes a transformer means in series with said brush motor to initiate operation of the gated switch to energize said suction motor, and adjustable means for varying the firing angle of said gated switch.

18. In a vacuum cleaner having a suction unit including a suction motor arranged to draw a first full load current, a floor cleaning unit including a brush rotatably driven by a brush motor arranged to draw a second full load current, and a suction hose connected between the suction unit and the floor cleaning unit and having a handle and electrical conductors extending in parallel lengthwise thereof, the improvement comprising:
an "On-Off" switch carried by said handle and connected to at least one of said hose conductors;
brush motor conductors carried by said floor cleaning unit for providing controlled energization of said brush motor by said "On-Off" switch; and
control means carried by said suction unit and floor cleaning unit responsive to said "On-Off" switch for causing energization of said suction motor concurrently with energization of said brush motor, said control means including a gated electronic switch in series with said suction motor and circuitry connected to said "On-Off" switch to be responsive to a condition of said "On-Off" switch causing current flow through said brush motor to cause said gated switch to effect said energization of the suction motor, and adjustable means for varying the firing angle of said gated switch for controlling the speed of the energized suction motor.

19. The vacuum cleaner structure of claim 18 wherein three said electrical conductors are provided in association with said suction hose, and said control means includes a variable impedance device carried by said handle and control circuitry carried by said suction unit connected to said variable impedance device by at least one of said electrical conductors of the hose.

20. The vacuum cleaner structure of claim 18 wherein three said electrical conductors are provided in association with said suction hose, and said control means includes a variable resistor carried by said handle and control circuitry carried by said suction unit and including an electronic trigger connected to said variable resistor by at least one of said electrical conductors of the hose.

21. In a vacuum cleaner having a suction unit including a suction motor arranged to draw a first full load current, a floor cleaning unit including a brush rotatably driven by a brush motor arranged to draw a second full load current, and a suction hose connected between the suction unit and the floor cleaning unit and having a handle and electrical conductors extending in parallel lengthwise thereof, the improvement comprising:
an "On-Off" switch carried by said handle and connected to at least one of said hose conductors;
brush motor conductors carried by said floor cleaning unit for providing controlled energization of said brush motor by said "On-Off" switch; and
control means carried by said suction unit and floor cleaning unit responsive to said "On-Off" switch for causing energization of said suction motor concurrently with energization of said brush motor, said control means including a gated electronic switch in series with said suction motor and circuitry connected to said "On-Off" switch to be responsive to a condition of said "On-Off" switch causing current flow through said brush motor to cause said gated switch to effect said energization of the suction motor, and adjustable means for varying the firing angle of said gated switch for controlling the speed of the energized suction motor, said "On-Off" switch being operable to energize said suction motor and said brush motor concurrently, said circuitry further including current-reducing means for reducing the permissible current flow through the suction motor when energized concurrently with said brush motor.

22. The vacuum cleaner structure of claim 21 wherein said current-reducing means comprises means for controlling the firing angle of said gated switch.

23. The vacuum cleaner structure of claim 21 wherein said current-reducing means comprises means for controlling the firing angle of said gated switch to permit said adjustable means to vary the speed of the suction motor over a reduced speed range.

24. The vacuum cleaner structure of claim 21 wherein three said electrical conductors are provided in association with said suction hose and said control means includes an impedance device connected through one of said conductors to said circuitry for limiting the firing angle of said gated switch.

25. The vacuum cleaner structure of claim 21 wherein three said electrical conductors are provided in association with said suction hose and said control means includes an impedance device connected through one of said conductors to said circuitry for limiting the firing angle of said gated switch, said impedance device being carried by said suction unit.

26. The vacuum cleaner structure of claim 21 wherein three of said electrical conductors are provided in association with said suction hose and said control means includes an impedance device connected through one of said conductors to said circuitry for adjusting the firing angle of said gated switch, said impedance device being carried by said suction unit and said adjustable means being carried by said handle.

27. In a vacuum cleaner having a suction unit including a suction motor arranged to draw a first full load current, a floor cleaning unit including a brush rotatably driven by a brush motor arranged to draw a second full load current, and a suction hose connected between the suction unit and the floor cleaning unit and having a handle and electrical conductors extending in parallel lengthwise of said suction hose, the improvement comprising:
an "On-Off" switch carried by said handle and connected to at least one of said hose conductors;
brush motor conductors carried by said floor cleaning unit for providing controlled energization of said brush motor by said "On-Off" switch; and
control means carried by said suction unit and handle responsive to said "On-Off" switch for causing energization of said suction motor concurrently with energization of said brush motor, said control means including a gated electronic switch in series with said suction motor and circuitry connected to said "On-Off" switch to be responsive to a condition of said "On-Off" switch causing current flow through said brush motor to cause said gated switch to effect said energization of the suction motor by reducing the current draw of said suction motor, three said electrical conductors being provided in association with said suction hose, and said "On-Off" switch comprising a single pole single throw switch connected between one of said electrical conductors and said suction motor.

28. The vacuum cleaner structure of claim 27 wherein said circuitry includes a transformer responsive to current flow to said brush motor and to cause said control means to reduce current flow through the suction motor.

29. The vacuum cleaner structure of claim 27 wherein said circuitry includes a transformer carried by said suction unit responsive to current flow to said brush motor to reduce current flow through the suction motor.

30. The vacuum cleaner structure of claim 27 wherein said single pole, single throw switch is carried by said handle.

31. In a vacuum cleaner having suction means including a suction motor adapted for attachment to a power source, a suction hose, surface cleaning means attached to said suction means by said suction hose, said suction hose including at least two electrical conductors for connection to a power source and having a first end associated with said suction means and an opposite end associated with said surface cleaning means and having a handle attached to said surface cleaning means, the improvement comprising a control circuit including switch means mounted on said handle and a gated switch means in series with said suction motor, a trigger circuit for gating said gated switch means, a first current sensor responsive to the condition of said handle mounted switch for effecting operation of said trigger circuit, and a second current sensor responsive to the magnitude of the current in said control circuit for reducing the voltage applied to said suction motor when the current in said control circuit exceeds a predetermined level.

32. The vacuum cleaner structure of claim 31 wherein said control circuit comprises means for adjusting the speed of the suction motor, said speed adjusting means being carried by said suction means.

33. The vacuum cleaner structure of claim 31 wherein said switch means mounted on said handle comprises an "On-Off" switch for effecting operation of said suction motor.

34. The vacuum cleaner structure of claim 31 wherein there is a resistor connected to said switch means mounted on the handle, and said suction hose includes only two electrical conductors, one of them being connected to said switch means mounted on the handle and the other of them being connected to said resistor.

35. The vacuum cleaner structure of claim 34 wherein said surface cleaning means comprises a dusting tool and said handle mounted switch is connected in series with said resistor.

36. The vacuum cleaner structure of claim 31 wherein said surface cleaning means comprises a floor cleaner including a brush motor adapted for attachment to a power source for supplying power to both said suction motor and said brush motor.

* * * * *